E. A. Hearne.
Cotton Picker.
N°. 452.
31,456.
Patented Feb. 19, 1861.
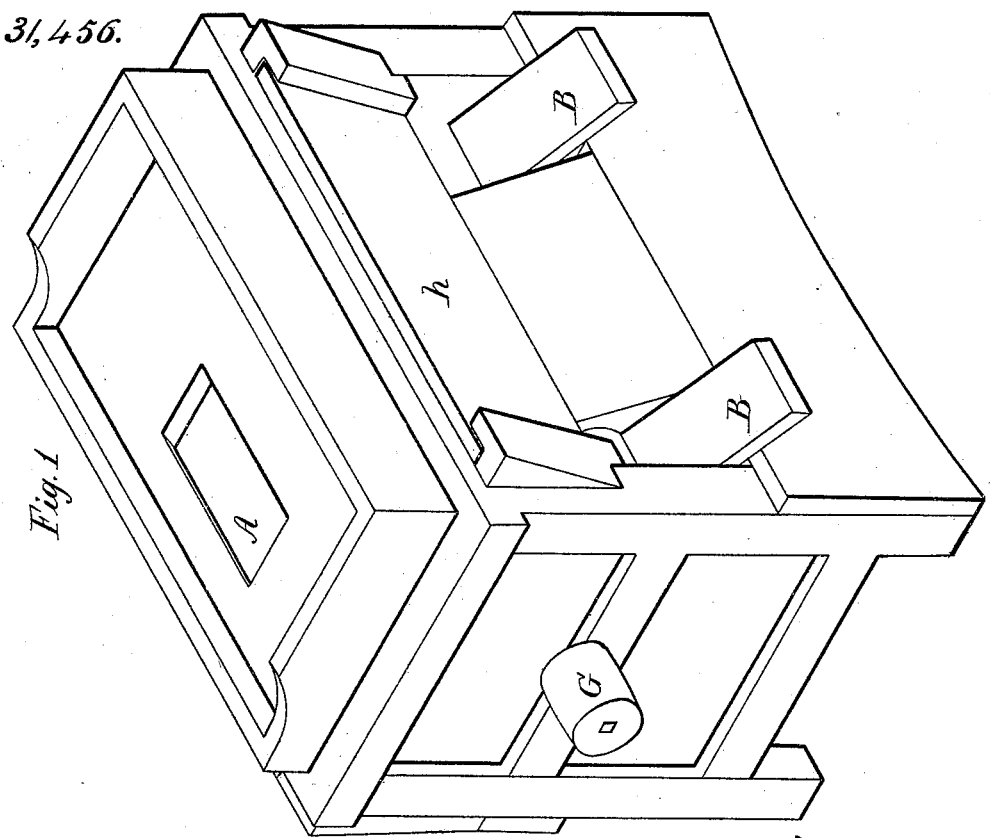
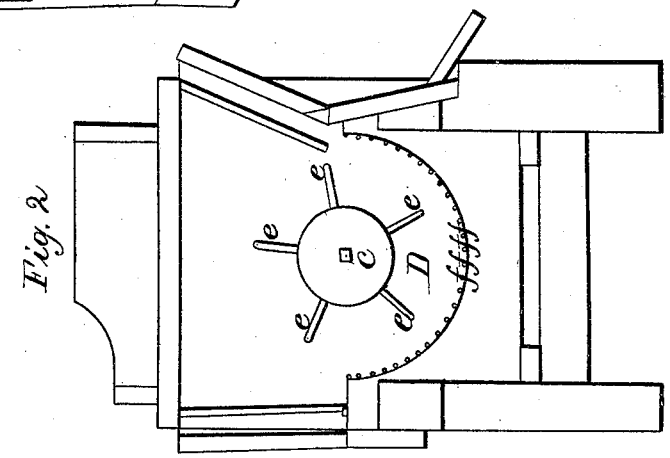
Witnesses
Thos. C. Hartwell
Pat. D. McCall
Inventor
Elisha A. Hearne

UNITED STATES PATENT OFFICE.

ELISHA A. HEARNE, OF LOWNDES COUNTY, ALABAMA.

COTTON-CLEANER.

Specification of Letters Patent No. 31,456, dated February 19, 1861.

*To all whom it may concern:*

Be it known that I, ELISHA A. HEARNE, of the county of Lowndes and State of Alabama, have invented a new and useful Improvement in a Machine for Separating the Dirt and Trash from Cotton Before it is Ginned; and I do hereby declare that the following is a full and exact description of my improvement.

The nature of my invention consists in the arming of a revolving drum with a series of paddle shaped beaters arranged in lines all around the drum and extending from one end of it to the other, the drum revolving on axes in each end of the box it runs in. The lower half of the box is of a semi circular form and is termed the screen.

To enable others skilled in the art, to make and use my invention, I will proceed to describe its construction and operation.

I construct my machine, for separating dirt and trash from cotton, by making a box of suitable dimensions for the purpose, the lower half of which is made of a semi circular form, and is formed by a series of iron rods or wooden slats fastened to the concave surface of wooden segments, arranged at proper distances apart, to afford strength and stability to the ribs forming the screen. The upper half of the box is so constructed that an opening may be had to the inside by sliding or hinged shutters. The drum being constructed as described is made to revolve by a belt or other means and while in motion the cotton is fed into the machine through the feed hole in the center on the top of the box. The cotton falling on the drum is carried forward and around with it for sometime until it finds its way out of the box and screen through the discharge spouts situated near each corner on the backside of the box. The rubbing of the cotton against the ribs of the screen by the action of the drum and beaters frees it from all dirt and a portion of the trash, thereby leaving the cotton in good condition for the gin, the locks being opened and expanded by the process of passing through the machine.

The following figures and letters with reference being had to the annexed drawings make a part of this specification in which—

Figure 1 is a perspective view of the machine, showing the feed hole and discharge spouts. Fig. 2 is a cross section, taken through middle, showing the drum, beaters and screen.

Similar letters of reference indicate corresponding parts in each of the figures.

A is the feed hole, and is situated in the center on top of the box.

B, B, are the discharge spouts, and are situated near each corner at the back side of the box.

C is the drum.

D, is the screen, through which the dirt passes when the cotton is agitated by the drum and beaters.

E, E, E, E, are the beaters.

F, F, F, F, are the ribs of the screen.

G, the pulley—and—H the side shutters.

From the above description it will be seen that cotton however dirty, can be freed from the dirt and a portion of the trash, by being passed through this machine, and it is not only freed from dirt but is put in good condition for being ginned, the locks being opened and expanded and not twisted and matted as is usually the case with the cotton that passes through machines having their beaters set spirally.

This machine, is simple in its construction, easily managed, and can be gotten up by almost any mechanic; can be afforded at a low price, and is not liable to get out of fix.

There are many contrivances for separating the dirt from cotton, before it is ginned; but the most of them leave the cotton in a bad condition for ginning. It is in many instances twisted or matted up so that the fiber is injured in the ginning of it, but that objection is not urged against a machine of this description.

I claim—

A revolving drum, armed with a series of paddle shaped beaters, arranged in straight lines all around the drum combined with a central feed hole, and discharge spouts, situated near each corner on the back side of the box, the drum revolves in—as substantially described.

ELISHA A. HEARNE.

Attest:
 THOS. C. HARTWELL,
 JAMES D. MCCALL.